Aug. 3, 1954
C. E. BARKALOW ET AL
2,685,207
COMPENSATED GYRO VERTICAL
Filed Sept. 24, 1949
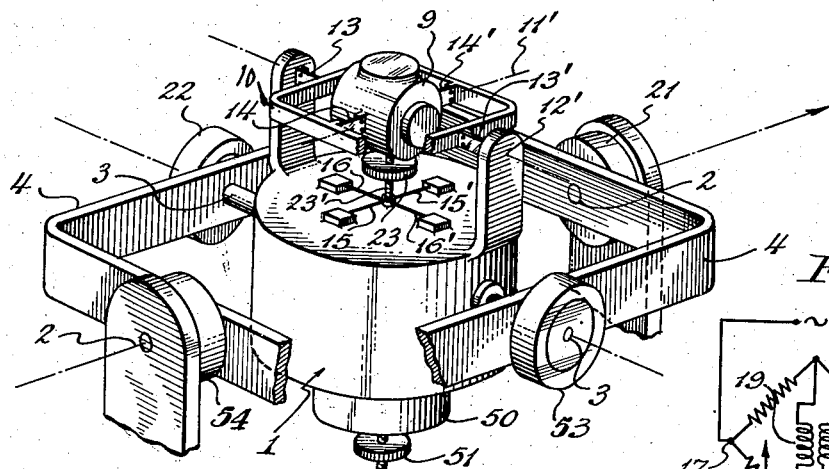
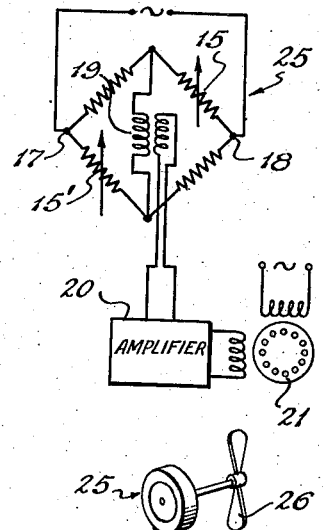
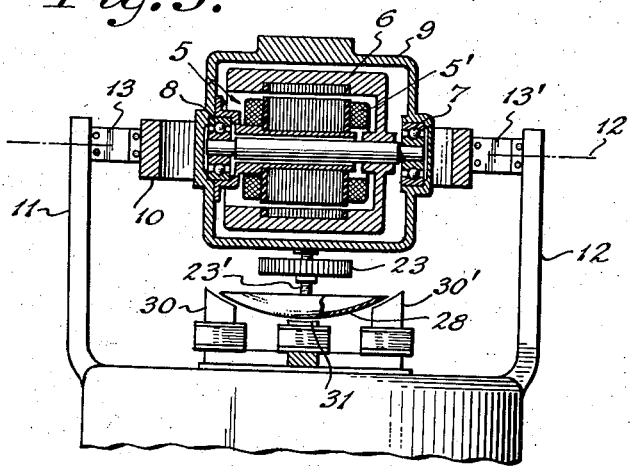
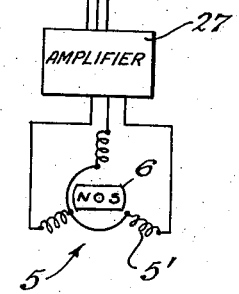
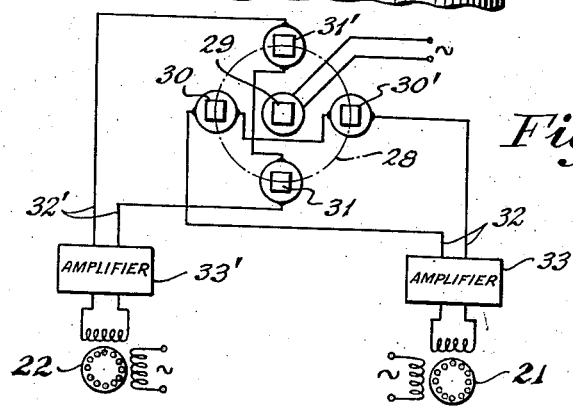
INVENTORS
SPENCER KELLOGG 2ND
CLARE E. BARKALOW
BY
THEIR ATTORNEY Patented Aug. 3, 1954

2,685,207

UNITED STATES PATENT OFFICE 2,685,207

COMPENSATED GYRO VERTICAL

Clare E. Barkalow, Huntington, and Spencer Kellogg 2nd, Glen Head, N. Y., assignors to The Sperry Corporation, a corporation of Delaware Application September 24, 1949, Serial No. 117,631

13 Claims. (Cl. 74—5.37)

This invention relates to gyroscopic artificial horizons or gyro verticals. As at present constructed, such instruments are quite accurate when the vehicles on which they are mounted are stationary or move with a uniform velocity in a straight line, but persistent turns or changes in speed cause deviations from the vertical due to the fact that the usual gyro vertical is controlled by some form of pendulum or other direct gravitational reference which is influenced by extraneous accelerations. Any such deviations persist until damped out and hence are objectionable.

According to our invention, we propose controlling the gyro vertical by mounting thereon an auxiliary gyroscope of the rate of turn type but which has incorporated therein certain features of a gyro-compensated pendulum, known as the Sperry pendulum, an early form of which was shown in the patent to Elmer A. Sperry No. 1,880,994, an improved form being shown in the prior patent application of Spencer Kellogg, 2nd, now Patent No. 2,595,268, dated May 6, 1952, for Instrument Providing a Vertical Reference for Dirigible Craft.

The laws governing the operation of a Sperry pendulum are only strictly applicable when the spin axis of the pendulum is horizontal. Accordingly, when such axis becomes inclined more than a few degrees, the torques caused to be applied by the Sperry pendulum to the main gyro become increasingly in error as the tilt increases. With our invention, we have overcome this difficulty by mounting the Sperry pendulum on a stabilized platform, i. e., upon the main gyro vertical and by coupling or restraining it to the gyro vertical so that the spin axis does not depart materially from the horizontal. By this means, we also secure the advantage that the gyro need not be given full freedom about both its horizontal axes, as is necessary in an unstabilized Sperry pendulum, since ordinary restraining or damping devices cannot be used directly between such a pendulum and the aircraft without disturbing the Sperry pendulum.

Therefore, according to our invention, we propose to mount our improved rate gyroscope directly on the main gyro-vertical to be controlled which together form a universally mounted gyro unit; and to couple such gyroscopes by resilient, but stiff connections about both fore-and-aft and lateral axes. We also incorporate in the resilient connections or provide in addition thereto, pick-offs responsive to any change in relative tilt between the rate gyro and main gyro vertical, which control torquers on the main gyro vertical to cause it to follow the position of the rate gyro about both horizontal axes. Since our rate gyro is mounted on the gyro vertical and strongly constrained by springs, no dampers need be provided, such as shown in the prior aforesaid Kellogg application, but may be used, if desired.

We are aware that mounting of an auxiliary gyroscope with a horizontal spinning axis on the main gyro vertical will cause the virtual axis of the combined unit to become laterally inclined from the vertical through a small angle the tangent of which is the ratio between the angular momentum of the auxiliary gyro to that of the main gyro. This virtual inclination would ordinarily be expected to give rise to an error in the indication of the instrument. While according to one modification (not shown) this error could be avoided by mounting a second auxiliary gyroscope on the main gyroscope similar to the first, but spinning in the opposite direction, we have found a simpler means to overcome this difficulty, by making the combined unit pendulous by a pendulous factor equal to that of the auxiliary gyroscope. When this is done and when the pendulousness of the auxiliary gyroscope is a proper amount to cause the auxiliary gyroscope to remain vertical during turns and changes of speeds of the craft (bearing in mind that the rotor speed is varied with air speed) the virtual axis will be inclined laterally at the proper angle so that during turns the pendulous factor at that time will cause the virtual axis of the combined unit to precess in azimuth at the same rate that the ship turns. In other words, the spin axis of the main gyro, at all times, will remain truly vertical although the virtual axis will be oriented around it during a turn at the same rate the ship turns.

Referring to the drawings in which several preferred forms of our invention are shown, Fig. 1 is a perspective view of our improved gyro vertical with our improved auxiliary gyro mounted thereon forming a part thereof;

Fig. 2 is a wiring diagram showing how one torquer may be controlled from a pick-off on the gyro, by means of a strain gauge which also operates as an elastic coupling between the rate gyro and gyro vertical;

Fig. 3 is a side elevation partly in section of the rate gyro with an alternative form of universal inductive pick-off;

Fig. 4 is a wiring diagram of this form of pick-off or controller; and

Fig. 5 is a diagram showing one method of keeping the rotor speed of the rate gyro proportional to air speed.

Referring first to Fig. 1, the main gyro vertical is shown as having its rotor case or frame 1 universally mounted on a craft in outer or major trunnions 2 extending fore and aft and minor athwartship trunnions 3 within the gimbal ring 4. One or more rotors may be contained within the case 1 (see for instance the patent to R. F. Hays, Jr., No. 2,591,697 dated April 8, 1952, for Stable Reference Apparatus), but where only one rotor is employed, the spin axis thereof is vertical.

On the case 1, we have shown universally mounted our special rate gyro or gyro-compensated pendulum. Said gyro is shown as comprising a motor 5 whose field 5' is fixed to a rotor case 9 and whose movable armature forms the gyro rotor 6 journaled on bearings 7 and 8 within rotor case 9 on a normally horizontal, athwartship spin axis. The rotor case 9 is universally supported and preferably resiliently centralized on the gyro case 1 by a suitable universal mounting. For this purpose, a gimbal ring 10 is shown between case 9 and the brackets 11 and 12 by which the case is pivoted on the frame 1 about a fore-and-aft axis 11' and on an athwartship axis 12' parallel to the normal position of the spin axis of the rotor. Casing 9 is shown as made pendulous about axes 11' and 12' as by adjustable mass 23 threaded on stem 23'. While ordinary bearings may be used about axes 11' and 12', we prefer a torsion suspension to eliminate static friction, and also to provide strong centralizing torques to confine the precession of the rate gyro to small angles and give it a short period. For this purpose, we have shown short leaf springs 13, 13' between the gimbal 10 and brackets 11 and 12 which are substantially rigid vertically, but provide a torsionally elastic support about the horizontal axis 12'. Similar leaf springs 14 and 14' are shown between the case 9 and gimbal 10 about the fore-and-aft axis. Obviously gimbal 10 may have its major axis fore and aft and its minor axis athwartship, as are the axes of gimbal 4 if desired, but the spin axis 12' of the rotor should remain athwartship.

As pick-offs responsive to relative tilt between the two gyroscopes, we have shown in Fig. 1 four tension wires 15, 15', 16 and 16' anchored at their outer ends to the top of casing or frame 1 and at their inner ends to the stem 23' extending downwardly from case 9. These wires constitute differential strain gauges as now well known in the art (see the patent to Simmons 2,292,549) and when the tension on the same is varied, a proportional signal appears across an electrical network for directly or indirectly operating torquers about the main axes of the gyro at right angles to the tilt.

For this purpose, each pair of strain gauges may be connected to the form of a Wheatstone bridge 25 as shown for one pair in Fig. 2 and supplied with a source of current (shown as A. C.) across terminals 17 and 18. The primary of a transformer 19 may be connected across the other two terminals and the output of the secondary used to supply a control signal, preferably amplified by an amplifier 20 to a torquer 21 acting about an axis of the main gyro vertical at right angles to the axis of tilt. The other strain wires 16, 16' similarly control torquer 22. Hence, any relative tilt between the gyro vertical and rate gyro is detected and a proportional and reversible torque is applied to the main gyro to cause it to slowly follow the rate gyro. In Fig. 1, the strain wires supplement the centralizing action of leaf spring supports 13 and 14 so that plain gimbal bearings could be used instead, if desired. It is also obvious that other forms of impedances might be used instead of the strain wires as long as the impedance varies with the pressure or strain exerted thereon by the precession of the gyro.

The mass of auxiliary gyroscope as shown (exclusive of the adjustable pendulous mass 23) is balanced by mass 51 on the bottom of the main gyroscope. We also provide on the bottom of the main gyroscope a second adjustable mass 51 threaded on a stem. For reasons hereinafter explained we adjust the two masses in a series of balancing operations somewhat as follows: First we adjust the mass 23 on threaded shaft 23' under the rate gyroscope until the rate gyroscope is neutrally balanced about both horizontal axes 11' and 12'. Second, we adjust the mass 51 until the entire assembly or combined unit is balanced about axes 2 and 3 and finally we move the mass 23 down until the desired pendulosity of the rate gyro is secured to give rise to a centrifugal couple sufficient to cause precession about its vertical axis at an angular velocity during normal turns equal to the rate of turn of the aircraft. This adjustment will give the entire assembly the same pendulosity and will as hereinafter explained cause the rotation of the virtual inclined axis of this assembly about the vertical axis at the same rate as the rate of turn of the craft.

Due to the longer period of the main gyro temporary errors in the auxiliary or rate gyro do not appear in the main gyro and furthermore, the disturbing effects of turning and change of speed do not reach the main gyro because of special design properties of this type of rate gyro resembling those of the Sperry pendulum. This compensation is secured during turns by the fact that centrifugal force acting on the pendulous factor of the rate gyro, represented by mass 23 on case 9, causes precession about the vertical axis at a rate proportional to the centrifugal force. Since in curved flight or turns the centrifugal acceleration (A) is equal to the product of rate of turn (ω) and true air speed V ($A = \omega V$) we so design the rate gyro and its pendulous factor P, that the precession of the same about the vertical axis due to centrifugal forces equals the rate of turn of the craft for a selected air speed, so that no reaction appears between the two gyros, nor is any torque producing signal generated by the pick-off on the gyro pendulum to disturb the main gyro. Then by changing the rotor speed proportionally to changes in true air speed from a selected or normal speed, the same absence of torque may be obtained for all air speeds.

At the same time by varying the rotor speed with the true air speed of the craft the deviation otherwise caused by change of speed is also compensated for as is now explained. The reaction exerted by the spinning motor field 5' on the shell or casing 9 is of course proportional to the torque between the motor and the shell, which in turn is proportional to the acceleration $$\frac{d\omega''}{dt}$$

imparted to the rotor 6 (neglecting frictional effects). This torque tends to lift the mass 23 an amount proportional to a function of such acceleration and in a direction dependent upon whether the acceleration is positive or negative. Since the direct effect of linear acceleration on the mass also tends to lift the same in one direction or the other, these two forces may be made equal and opposite, as explained in the aforesaid prior Kellogg application and hence linear acceleration forces due to changes of speed likewise do not affect the gyro-compensated pendulum and it remains truly horizontal.

The rotor speed ($\omega''$) may be proportioned to true air speed by any suitable arrangement diagrammatically represented in Fig. 5. In this figure the polyphase generator 25' which supplies current for the field 5' of synchronous spinning motor 5 is shown as driven from a fan 26 in the slip stream of the aircraft so that generator speed and hence the rotor speed $\omega''$ is generally proportional to true air speed (V). Amplifier 27 may be employed between the generator 25 and the spinning motor 5 so that the fan is very lightly loaded.

The above stated relationships may be readily appreciated from the following simplified mathematical analysis:

The rate of precession ($\omega'$) of applicant's rate gyroscope during a turn is approximately (1) $$\omega'=\frac{V\omega P}{H'}$$

V=true air speed of the aircraft.
$\omega$=rate of turn of the aircraft.
P=pendulosity of the rate gyroscope.
H'=angular momentum of the rate gyroscope.

As stated above, for proper compensation, the rate of precession of the rate gyro is made equal to the rate of turn of the aircraft or $$\omega'=\omega$$

Equation 1 may therefore be written (2) $$H'=VP$$

But H' may also be written I'$\omega''$ where I' is the moment of inertia of the gyro rotor and $\omega''$ the angular velocity of the gyro rotor. Rewriting (2) we have $$\omega''=\frac{VP}{I'}$$

or (3) $$V=\frac{\omega''I'}{P}$$

Now if the above relationship is to be met continuously during changes in true airspeed, then Equation 3 may be differentiated with respect to time giving $$\frac{dV}{dt}=\frac{d\omega''}{dt}\times\frac{I'}{P}$$

or (4) $$P\frac{dV}{dt}=I'\frac{d\omega''}{dt}$$

The left hand side of Equation 4, it will be readily appreciated, is a measure of the torque due to linear acceleration force acting on the pendulous gyro, whereas the expression on the right hand side is a measure of the torque on the gyro due to the acceleration of the rotor, and shows that the torque created by the fore and aft acceleration acting on the pendulosity is equal and opposite to that required to produce the required acceleration of the gyro rotor when centrifugal errors are eliminated and therefore that no displacement of the pendulum occurs during linear acceleration as well as during centrifugal acceleration.

In Figs. 3 and 4 the elements of the rate gyro itself are the same as in Fig. 1 but a different form of pick-off is shown. In this form a universal inductive pick-off is provided which may be in the form of a dish-shaped disc 28 suspended below the casing 9 on stem 23' which will normally be symmetrically located with respect to symmetrically arranged pole pieces 30, 30', 31 and 31' and central pole piece 29, each provided with a winding. The winding on central pole 29 is excited from a single phase supply and the individual windings on the opposite poles 30, 30', and on 31, 31' are connected in opposition by leads 32, 32', respectively. One pair of poles 30, 30' is connected through amplifier 33 to torquer 21 on the main gyroscope, and the other pair of poles, 31, 31' is connected through the amplifier 33' to a torquer 22, the torquers acting about axes at right angles to the tilts as in Fig. 1. In this form little or no centralizing force is exerted by the pick-offs of the two gyroscopes so that it is necessary to provide centralizing springs between the two gyroscopes for this purpose. In Fig. 3 this result is effected solely by making the supports about two axes in the form of leaf springs 13, 14 as in Fig. 1.

As explained above, the main and auxiliary gyros are in effect the equivalent of a single gyro having its spin axis slightly inclined laterally through an angle whose vertical component is proportional to the gyroscopic momentum in the main gyro and the lateral component is proportional to the gyroscopic momentum of the rate gyro. This virtual inclination would apparently cause an error in the system. As stated above, one method of preventing this error is by mounting on the main gyro a second auxiliary gyro (not shown) of like constants but spinning in the opposite direction from the other auxiliary gyro. In such case the entire assembly would be made neutrally balanced about axes 2, 3.

We prefer, however, a simpler method of overcoming this problem, i. e., to make use of the known fact (see the patent to F. D. Braddon, dated August 12, 1949, No. 2,425,300) that the turning error of a pendulous gyro vertical may be prevented by inclining the spin axis of the gyro vertical laterally a sufficient amount so that the azimuth component of the gyro momentum will precess in azimuth at the rate that the craft turns assuming the speed of the rotor of the auxiliary gyro to be kept proportional with the speed of the craft as explained above. We therefore make the gyro combination pendulous about axes 2 and 3, as represented by mass 51, and by making this pendulous factor the same as that of the auxiliary gyro due to the unbalance of mass 23 on it (by the balancing operation hereinbefore described), the gyro design may readily be made such that the deviating effects of turns will be completely avoided and the actual position of the spin axis of the main gyro remains truly vertical. Making the combined gyro unit slightly pendulous also has the advantage that the unit will remain upright when not running, so that when it is started up it will be in substantially vertical position and require less time to settle. In fact, many gyro verticals in the prior art having power erectors have been given slight pendulosity for this purpose alone, even though in such prior art gyro verticals this resulted in an error during turns. In some cases this was overcome by giving the gyro axis a lateral inclination. With our invention, on the other hand, the above advantages of a slightly pendulous gyro are secured without giving rise to turn errors and without actually inclining the spin axis of the principal gyro. In other words, the virtual inclined angular momentum vector of the two gyros has the proper horizontal component of angular momentum to cause it to be precessed in azimuth at the same rate that the turn is made so that the main gyro axle remains vertical and the axis of the combined unit moves around the vertical in a cone. Since the spin axis of the main gyro remains truly vertical, its position may be used as an indicator of the true vertical and may be transmitted to a distance from transmitters 53, 54 at the horizontal axes thereof.

The above relationship may also be understood from the following analysis:

For a gyro unit inclined at an angle $\alpha$ to the vertical and with pendulosity P, the requirement for compensation during a turn is that the rate of turn ($\omega_r$) of the inclined axis is equal to the rate of turn of the craft $\omega$. But $$\omega_r = \frac{PV\omega}{H \sin \alpha} = \omega$$

or (5) $\qquad PV = H \sin \alpha$ where H is the angular momentum of the unit.

Now $H \sin \alpha$ is merely the horizontal component of the total angular momentum of the unit H. If H is arrived at by vectorially adding the angular momentum H' of the horizontally spinning gyro and the angular momentum H'' of the vertically spinning gyro, then $H \sin \alpha$ is representative of and equal to H' or Equation 5 may be written (6) $\qquad H' = PV$ This is exactly the same relationship between the gyroscope, pendulosity and true air speed required under Equation 2 for producing a proper compensation for the effects of centrifugal force and fore-and-aft acceleration, thus showing that if the pendulosity (P) of the rate gyro and the combined gyro unit is made the same, turn errors and errors due to centrifugal force are completely eliminated.

From the foregoing it is apparent that our improved gyro vertical is vastly superior to prior gyro-verticals, especially for high speed aircraft. Since the effects of changes of speed and course do not reach the main gyro it will remain vertical. The only effect centrifugal force acting on the mass 23 on the auxiliary gyro is to cause the auxiliary gyroscope to turn in azimuth at the rate that the ship turns and hence no erection signal is created and no reaction reaches the main gyro. At the same time the effect of linear acceleration due to changes of speed of the craft does not reach the system since the effect is balanced by a corresponding change of speed of the rotor of the auxiliary gyro which is introduced at the same time. Moreover, the rotor speed need not be changed exactly synchronously with the craft's change of speed since all that is necessary is that the rotor speed be proportional to craft speed shortly after the craft speed becomes constant, since momentary departures do not cause appreciable errors in the system, and the integrated effect is correct. The main gyroscope 1 remains substantially unaffected by changes of speed or course since no signal is sent to the erecting torquers 21, 22 from the controllers 15, 16 on the gyroscope because the Sperry pendulum is unaffected by such forces for the reasons explained above. Since the erection controls and torquers are the primary factors relied upon to erect the gyro vertical, the gyroscope hence remains vertical regardless of the character or severity of the gyrations through which the airplane is put. Furthermore, no error due to the inclination of the virtual vertical of the combined unit is introduced, if the pendulous factor of the gyroscope combination is kept the same as that of the auxiliary gyro.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A compensated multiple gyro, vertical reference for craft comprising a main vertical gyro, an auxiliary gyro of the rate of turn type pendulously mounted on the main gyro on normally horizontal axes, said auxiliary gyro having its spin axis lateral, spring restraining means between the main and auxiliary gyros about said axes, and means responsive to relative tilt of said main and auxiliary gyros for applying erecting torques on the main gyro, the pendulosity of the auxiliary gyro being such that during a turn at a predetermined air speed, the said gyro is caused to precess in azimuth by centrifugal force at the same rate that the craft is turning.

2. A compensated multiple gyro reference as claimed in claim 1 wherein the multiple gyro unit is given the same pendulosity as the rate gyro, whereby the resultant axis of rotation becomes oriented in azimuth during such a turn at the same rate of turn as the craft and the main gyro remains vertical.

3. A compensated multiple gyro reference as claimed in claim 1 having means for varying the speed of the rotor of the rate gyro with the true air speed of the craft whereby the rate gyro is caused to precess in azimuth by centrifugal force at the same rate that the craft is turning, regardless of the speed of the craft.

4. A compensated gyro-vertical unit for craft including a main gyro-vertical, a gyro-compensated pendulum universally pivoted about fore and aft and athwartship axes, a gyro-rotor mounted in said pendulum for spinning about an athwartship axis, spring centralizing means connecting said pendulum to the gyro vertical about both of said axes, and pick-offs about the universal pivots of the pendulum for creating signals for erecting the main gyro upon tilt thereof with respect to said pendulum.

5. A control system for aircraft gyro verticals including a normally vertical gyro, a gravity reference for said gyro comprising a gyro-compensated pendulum universally mounted thereon about axes parallel to the athwartship and fore-and-aft axes of the craft, a gyro-rotor mounted in said pendulum for spinning about an axis coincident with the athwartship axis of the pendulum at a speed proportional to the speed of the craft, resilient means connecting said gyro-pendulum to said vertical gyro about both horizontal axes, a pick-off about the fore-and-aft axis of the pendulum, a pick-off about the athwartship axis of the pendulum, and erecting means for said vertical gyro responsive to the outputs of said pick-offs.

6. A compensated gyro-vertical unit for craft comprising a universally mounted main gyro having a normally vertical spin axis, an auxiliary smaller gyro universally and pendulously mounted thereon for spinning about a normally athwartship horizontal axis, spring constraining means between said gyros, whereby the virtual axis of the unit is laterally slightly inclined, pick-off means between said main and auxiliary gyroscopes, torquers controlled thereby for erecting the main gyroscope, and means for maintaining the rotor speed of the auxiliary gyro proportional to true air speed of the craft, the unit being given a pendulous factor sufficient to cause turning of the inclined axis in azimuth at the same rate that the craft turns.

7. A compensated multi-gyro, vertical reference unit for craft comprising a universally mounted main gyro having a normally vertical spin axis and an auxiliary smaller gyro mounted thereon for spinning about a normally athwartship horizontal axis, whereby the virtual axis of the unit is laterally inclined, said auxiliary gyro being pivoted on and yieldingly coupled to the main gyro about normally horizontal axes with a pendulous factor about the fore-and-aft axis of an amount to cause precession in azimuth at the rate the craft turns for a predetermined speed, and said unit having the same pendulous factor, whereby said inclined axis rotates in azimuth at the same rate and the spin axis of the main gyro remains vertical.

8. A compensated multi-gyro, vertical reference unit as claimed in claim 7 also having means for varying the rotor speed of the auxiliary gyro proportionally to air speed variations whereby said main gyro remains vertical for all air speeds.

9. A compensated gyro-vertical unit for craft including a main gyro-vertical, a gyro-compensated pendulum means pivoting said pendulum on said gyro vertical about fore-and-aft and transverse axes, a gyro-rotor mounted in said pendulum for spinning about an athwartship axis, and pick-offs of the resilient strain gauge type about the universal pivots of said pendulum for creating signals for erecting the main gyro upon tilt thereof with respect to said pendulum and for restraining the excursions and oscillations of the said pendulum.

10. A compensated gyro-vertical unit for craft including a main gyro-vertical, a gyro-compensated pendulum universally pivoted thereon, a gyro-rotor mounted in said pendulum for spinning about an athwartship axis, restraining means opposing precession of said pendulum about both horizontal axes, said means having impedance variable with strain, circuits containing said means and having created therein reversible signals upon straining of said means in one direction or the other, and torquers for the main gyro controlled from the outputs of said circuits.

11. A compensated gyro-vertical unit for craft including a main gyro-vertical, a gyro-compensated pendulum universally pivoted thereon, restraining means acting between said main gyro and pendulum for confining the precession of said pendulum to a small angle, and a gyro-rotor mounted in said pendulum for spinning about an athwartship axis, said restraining means being in the form of variable impedances variable with the pressure exerted by precession, and being so arranged as to create signals for erecting the main gyro upon relative tilt of the main gyro and pendulum.

12. As a means for preventing acceleration errors in pendulous gyro-verticals for craft, the combination with a gyro-vertical, of an auxiliary gyroscope pendulously mounted thereon with its spin axis adapted to be placed athwartship on the craft, torsion springs resiliently pivoting and centralizing said auxiliary gyroscope on said gyro-vertical about normally horizontal axes, and means for varying the rotor speed of the auxiliary gyro with the speed of the craft.

13. As a means for permitting pendulosity in a multi-gyro stable reference unit without incurring turn and acceleration errors, the combination with a universally mounted gyro vertical, a rate gyroscope universally gimballed thereon about normally horizontal axes, and having the same pendulous factor about said axes, the rotor of said rate gyroscope having its spin axis athwartship on the craft, the two gyroscopes forming a multiple gyro unit having the same pendulous factor as the rate gyroscope about its horizontal axes of support, and means for maintaining the rotor speed of the rate gyroscope substantially proportional to the airspeed of the craft.

References Cited in the file of this patent

UNITED STATES PATENTS

| Number | Name | Date |
|--------|------|------|
| 1,442,799 | Gray | Jan. 23, 1923 |
| 1,932,210 | Glitscher | Oct. 24, 1933 |

FOREIGN PATENTS

| Number | Country | Date |
|--------|---------|------|
| 221,006 | Great Britain | Sept. 1, 1924 |